(12) United States Patent
Kalluri et al.

(10) Patent No.: US 10,571,989 B2
(45) Date of Patent: Feb. 25, 2020

(54) LOW ENERGY SYSTEM FOR SENSOR DATA COLLECTION AND MEASUREMENT DATA SAMPLE COLLECTION METHOD

(71) Applicants: VeriSilicon Microelectronics (Shanghai) Co., Ltd., Shanghai (CN); VeriSilicon Holdings Co., Ltd., Plano, TX (US)

(72) Inventors: Seshagiri Prasad Kalluri, Richardson, TX (US); Vijayanand Angarai, Allen, TX (US); Adam Christopher Krolnik, Wylie, TX (US); Venkata Krishna Vemireddy, San Jose, CA (US)

(73) Assignees: VeriSilicon Microelectronics (Shanghai) Co., Ltd., Shanghai (CN); VeriSilicon Holdings Co., Ltd., Plano, TX (US)

( * ) Notice: Subject to any disclaimer, the term of this patent is extended or adjusted under 35 U.S.C. 154(b) by 0 days.

(21) Appl. No.: 15/698,230

(22) Filed: Sep. 7, 2017

(65) Prior Publication Data
US 2019/0073014 A1 Mar. 7, 2019

(51) Int. Cl.
*G06F 1/32* (2019.01)
*G06F 1/3206* (2019.01)
*H04L 29/08* (2006.01)
*G06F 1/329* (2019.01)
*H04W 52/02* (2009.01)

(52) U.S. Cl.
CPC ............ *G06F 1/3206* (2013.01); *G06F 1/329* (2013.01); *H04L 67/125* (2013.01); *H04W 52/0225* (2013.01)

(58) Field of Classification Search
None
See application file for complete search history.

(56) References Cited

U.S. PATENT DOCUMENTS

| 6,836,824 | B1 * | 12/2004 | Mirov | G06F 1/08 711/118 |
| 8,224,993 | B1 * | 7/2012 | Brandwine | G06F 1/3203 709/244 |
| 9,323,314 | B1 * | 4/2016 | Jia | G06F 9/5094 |
| 9,541,982 | B2 * | 1/2017 | Lipasti | G06F 1/3206 |
| 2002/0116196 | A1 * | 8/2002 | Tran | G06F 1/3203 704/270 |
| 2009/0122650 | A1 * | 5/2009 | Calhoun | G01S 5/18 367/127 |

(Continued)

*Primary Examiner* — Danny Chan

(57) ABSTRACT

A data collection system includes one or more input sensing devices and a data collection device. The data collection device includes data collection circuitry that is continuously activated to capture measurement data samples from the one or more input sensing devices and locally store the measurement data samples. The data collection device also includes a digital processor that is coupled to the data collection circuitry and is activated to locally perform a sample analysis of the measurement data samples, wherein the sample analysis is a regular analysis of routine measurement data samples when the measurement data samples are without a triggering event, and wherein the sample analysis is an event analysis when the measurement data samples include a triggering event. A data collection integrated circuit and a measurement data sample collection method are also included.

20 Claims, 3 Drawing Sheets

(56) References Cited

U.S. PATENT DOCUMENTS

| | | | | |
|---|---|---|---|---|
| 2009/0213006 A1* | 8/2009 | Nayyar | ............... | G01S 19/36 |
| | | | | 342/357.36 |
| 2010/0274404 A1* | 10/2010 | Holbery | ............ | G01D 4/002 |
| | | | | 700/291 |
| 2012/0218086 A1* | 8/2012 | Miller | ............... | G08B 13/19 |
| | | | | 340/10.33 |
| 2012/0254878 A1* | 10/2012 | Nachman | .......... | G06F 9/5094 |
| | | | | 718/102 |
| 2014/0257821 A1* | 9/2014 | Adams | ............... | G10L 25/93 |
| | | | | 704/275 |
| 2016/0134966 A1* | 5/2016 | Fitzgerald | ............ | H04R 3/00 |
| | | | | 381/123 |
| 2018/0032455 A1* | 2/2018 | Savanth | .............. | G06F 13/24 |

\* cited by examiner

LOW ENERGY SYSTEM FOR SENSOR DATA COLLECTION AND MEASUREMENT DATA SAMPLE COLLECTION METHOD

TECHNICAL FIELD

This application is directed, in general, to data gathering systems and, more specifically to a data collection integrated circuit, a data collection system and a measurement data sample collection method.

BACKGROUND

This section introduces aspects that may help facilitate a better understanding of the disclosure. Accordingly, the statements of this section are to be read in this light and are not to be understood as admissions about what is prior art or what is not prior art. Applications employing input measurement devices can typically be designed to constantly collect data associated with their environment. These collection systems usually need to be "always-on" systems and may involve one or more sensors. For example, a microphone may be used to acquire data from its environment that is to be analyzed for its content. This collection and analysis activity is usually added to the tasks of a host general purpose processor in a system, wherein the host general purpose processor may also be used for controlling overall system operations including scheduling the timing of data collection and follow-on signal data processing. In such applications, other general system elements such as shared processing operations, shared system memory and various bus interactions along with multiple possible interface conditions come into play that may cause critical data collections to be corrupted or even missed. Additionally, the use of general system elements for always-on data collection and processing conditions tends to be expensive from an energy usage standpoint.

SUMMARY

One embodiment is a data collection integrated circuit. The data collection integrated circuit includes data collection circuitry configured to be continuously activated to capture measurement data samples from one or more input sensing devices and locally store the measurement data samples for sample analysis. The data collection integrated circuit also includes a digital processor coupled to the data collection circuitry and configured to be separately activated from the data collection circuitry to locally perform a regular sample analysis of routine measurement data samples and an event sample analysis when the measurement data samples have a triggering event.

Another embodiment is a data collection system. The data collection system includes one or more input sensing devices and a data collection device. The data collection device includes data collection circuitry that is continuously activated to capture measurement data samples from the one or more input sensing devices and locally store the measurement data samples. The data collection device also includes a digital processor that is coupled to the data collection circuitry and is activated to locally perform a sample analysis of the measurement data samples, wherein the sample analysis is a regular analysis of routine measurement data samples when the measurement data samples are without a triggering event, and wherein the sample analysis is an event analysis when the measurement data samples include a triggering event.

Yet another embodiment is a measurement data sample collection method. The measurement data sample collection method includes defining a sampling configuration for collecting measurement data samples, capturing the measurement data samples continuously with the sampling configuration and analyzing the measurement data samples, wherein a local sample analysis provides a regular analysis for measurement data samples that are routine and an event analysis when the measurement data samples have a triggering event.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

The embodiments of the disclosure are best understood from the following detailed description, when read with the accompanying Figures. Reference is now made to the following descriptions taken in conjunction with the accompanying drawings, in which.

DETAILED DESCRIPTION

Figure 1:
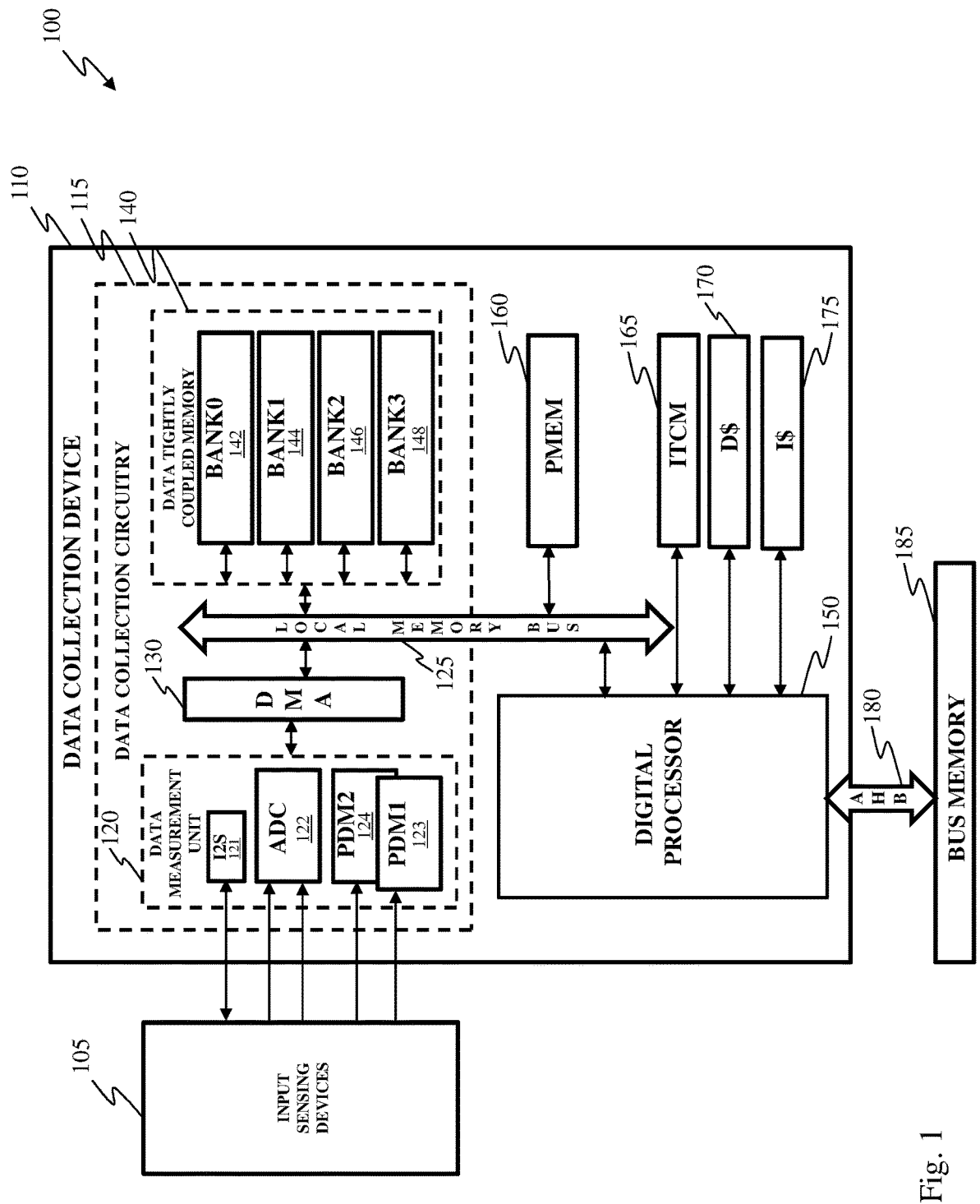
FIG. 1 illustrates an embodiment of a data collection system, constructed according to the principles of the present disclosure.

The description and drawings merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be for pedagogical purposes to aid the reader in understanding the principles of the disclosure and concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the present disclosure provide continuous monitoring and capture of measurement data samples employing a dedicated data collection integrated circuit (IC) or device that is designed to extend an overall operating time through electrical energy conservation. (As used herein, the terms "continuous" and "continuously" are defined as occurring without interruption or without cessation in time)

The dedicated data collection IC or device generally provides a local and independent selection and analysis of the measurement data samples. (Herein, the terms "local" and "locally" are defined as solely employing the dedicated data collection IC or device.) The dedicated data collection IC or device may receive a request for obtaining and analyzing certain types of measurement data samples from an external entity (e.g., an associated System on Chip (SOC)). Alternately, the dedicated data collection IC or device may report the results from obtaining and analyzing measurement data samples to the external entity.

For purposes of this disclosure, a sample analysis is either a regular analysis or an event analysis depending on whether the measurement data samples are routine measurement data samples or whether they contain a triggering event, respectively. Therefore, the regular analysis of routine data samples provides analysis results that are within established boundaries and have routine results that are basically anticipated or expected. In some embodiments, the regular analysis typically provides routine results of an "update" nature. Alternately, the event analysis of measurement data samples containing a triggering event recognizes that something unexpected and not routine has occurred in the measurement data samples being addressed. In some embodiments, the event analysis typically results in an alarm condition corresponding to and based on the nature of the triggering event.

For purposes of this disclosure, a triggering event of the measurement data samples is defined as a pattern of interest or a specific condition that has occurred in one or a collection of the measurement data samples. An occurrence of this pattern of interest requires a processing action that is outside of or beyond a normal or regular scope of analysis. For example, this triggering event occurrence can indicate that a measurement data sample limit has been exceeded and certain alarms are required to indicate this occurrence. Alternately, the pattern of interest can indicate that the one or more measurement data samples involve certain people or information that requires further analysis or reporting. Generally, a triggering event is defined as an event that is known and observed, or alternately, the triggering event can be something unexpected and recognized.

FIG. 1 illustrates an embodiment of a data collection system, generally designated 100, constructed according to the principles of the present disclosure. The data collection system 100 includes input sensing devices 105 coupled to a data collection device 110. The data collection device 110 includes data collection circuitry 115 having a data measurement unit 120, a local memory bus 125 employing direct memory access (DMA) 130 to the data measurement unit 120 and a data tightly coupled memory 140 coupled to the local memory bus 125.

The data measurement unit 120 includes an Inter-IC Sound ($I^2S$ or I2S, as shown) module 121, a dual input multiplexing analog-to-digital converter (ADC) 122 and first and second pulse-density modulation units (PDMs) 123, 124, as shown.

The data collection device 110 also includes a digital processor 150 that is coupled to the local memory bus 125. The data collection device 110 further includes a peripheral memory (PMEM) 160 coupled to the local memory bus 125 and an instruction tightly coupled memory (ITCM) 165, a data cache (D$) 170 and an instruction cache (I$) 175 coupled to the digital processor 150. The data collection system 100 additionally employs an Advanced High-performance Bus (AHB) 180 to interface with a bus memory 185 that is part of another processing system (e.g., a System on Chip associated with the data collection system 100).

In the data collection system 100, which can typically employ multiple input sensing devices and peripherals that function as output devices, an entire data acquisition path is provided that is completely internalized within the data collection device 110. That is, the entire data acquisition path from measurement data sample capture, data processing, transfer of processed data samples and resulting processed analysis or information to output peripheral devices is accomplished locally within the data collection device 110. This avoids having to employ data analysis or processing capabilities that are remote to the data collection device 110.

In the data collection system 100, the one or more input sensing devices 105 and the data collection device 110 are often embodied in an integrated circuit format. The input sensing devices 105 are sensing devices that provide desired characteristics for capture and analysis that are typically associated with their environment. Examples of the input sensing devices 105 will be further defined and discussed with respect to FIG. 2. The data collection device 110 employs the data measurement unit 120 to continuously capture measurement data samples from the one or more input sensing devices 105 and transfer them without data loss or interruption from the data measurement unit 120 to the data tightly coupled memory 140 for storage.

The Inter-IC Sound ($I^2S$) module 121 employs an electrical serial bus interface standard used for connecting digital audio devices together. In one application, it may be used to communicate pulse code modulated (PCM) audio data between integrated circuits in an electronic device. The $I^2S$ bus separates clock and serial data signals, resulting in a lower jitter than is typical of communications systems that recover the clock from the data stream.

The dual input multiplexing analog-to-digital converter (ADC) 122 accepts inputs from two separate input sensing devices, in this embodiment. These two input sensing devices provide analog signals to the ADC 122 that are multiplexed in time to be employed by the single ADC 122. The ADC 122 converts each of these two inputs into a corresponding and separate digital representation (i.e., a binary quantity) for storage in one or more of the memory banks 142-148.

Each of the first and second pulse-density modulation units (PDMs) 123, 124 accepts a separate analog input from the input sensing devices 105 for conversion into a digital representation. Pulse-density modulation is a form of modulation used to represent an analog signal with a binary quantity. Here, specific input signal amplitudes are represented by a corresponding number of pulses generated in a specific time frame (i.e., a pulse density), which is then converted into a binary quantity for storage in the data tightly coupled memory 140.

The data tightly coupled memory 140 is a local memory that is organized into four independent memory banks BANK0, BANK1, BANK2 and BANK3. These are also designated as memory banks 142, 144, 146 and 148, respectively, that are independently accessible by devices on the local memory bus 125. This memory organization allows for parallel access from multiple data measurement devices of the data measurement unit 120 through the DMA 130 of the local memory bus 125 to separate memory destinations as long as different ones of the memory banks 142-148 are employed. The memory banks 142-148 are also accessible to the digital processor 150 through the local memory bus 125 where the digital processor 150 can analyze captured measurement data samples stored in the memory banks 142-148.

Additionally, the local memory bus 125 can be used to interface any local hardware accelerators to the memory banks 142-148, as well.

Generally, the digital processor 150 initially configures the data collection circuitry 115, which provides a sampling environment, to define a sampling configuration for collecting measurement data samples. Additionally, configuration of output peripherals can also be accomplished with the digital processor 150 through the PMEM 160 interface.

The digital processor 150 provides a sample analysis of the measurement data samples wherein this sample analysis may basically capture an occurrence of or determine required features and corresponding relationships of the measurement data samples. The digital processor 150 employs the instruction tightly coupled memory (ITCM) 165, the data cache (D$) 170 and the instruction cache (I$) 175 to facilitate the sample analysis process. As noted earlier, the sample analysis is correspondingly a regular analysis when routine measurement data samples are encountered (i.e., those samples without a triggering event). Alternately, the sample analysis is an event analysis when the measurement data samples include a triggering event. The digital processor 150 provides the sample analysis for collected measurement data samples, which may be provided concurrently with continued collection of new measurement data samples, without losing data collection cadence.

The digital processor 150 may provide one or more sample analysis employing only measurement data samples corresponding to a same input sensing device (e.g., only temperature). Alternately, the sample analysis of the measurement data samples may include analyzing measurement data samples from different input sensing devices. Additionally, the sample analysis of the measurement data samples includes analyzing a selectable number of measurement data samples. Further, the sample analysis of the measurement data samples includes analyzing the measurement data samples on a periodic basis. Still further, an event analysis of the measurement data samples may be performed during an activation of a regular analysis upon discovery of a triggering event.

Results of these sample analyses may indicate updated information concerning trends associated with at least a portion of the measurement data samples. For example, this may apply to temperature or humidity monitoring. Such information may be reported over the AHB 180 to the bus memory 185 for use by another system, for example.

The digital processor 150 may also manage the resources in the data collection system 100 to ensure their optimal usage. This optimal usage may include taking the least amount of time for any given task or consuming a least amount of memory for a complete application, for example. Together, these and other operational considerations can contribute to a desired objective of reducing overall energy consumption, thereby enabling a longer and more reliable operation over an extended period of time, especially when operation is based on a supporting battery.

The PMEM 160 is a local memory subsystem containing a peripheral memory region that can be used for low latency access to memory mapped registers. It can be used to interface with multiple independent peripherals associated with the data collection device 110 using the memory mapped registers. The PMEM 160 can also be used to contain peripherals that can be used as an output device (i.e., a speaker for a voice subsystem).

The AHB 180 employs a bus protocol specified by Advanced Microcontroller Bus Architecture and accommodates large bus-widths (64/128 bits). A simple transaction on the AHB 180 consists of an address phase and a subsequent data phase without wait states and employing only two bus-cycles. Access to a target device is controlled through a multiplexer (non-tristate), thereby admitting bus access to one bus-master at a time.

Elements of the data collection system 100 that require a condition of being continuously powered-up (i.e., always-on) are any of the devices in the data measurement unit 115 that are collecting measurement data samples, the local memory bus 125 including the DMA 130, any of the memory banks 142-148 that are being actively employed by the data measurement unit 115 and possibly the PMEM 160. Alternately, the digital processor 150, the ITCM 165, The D$ 170, the I$ 175 and the AHB 180 can typically reside in a reduced-power state until activated. This results in an overall reduced energy consumption.

Figure 2:
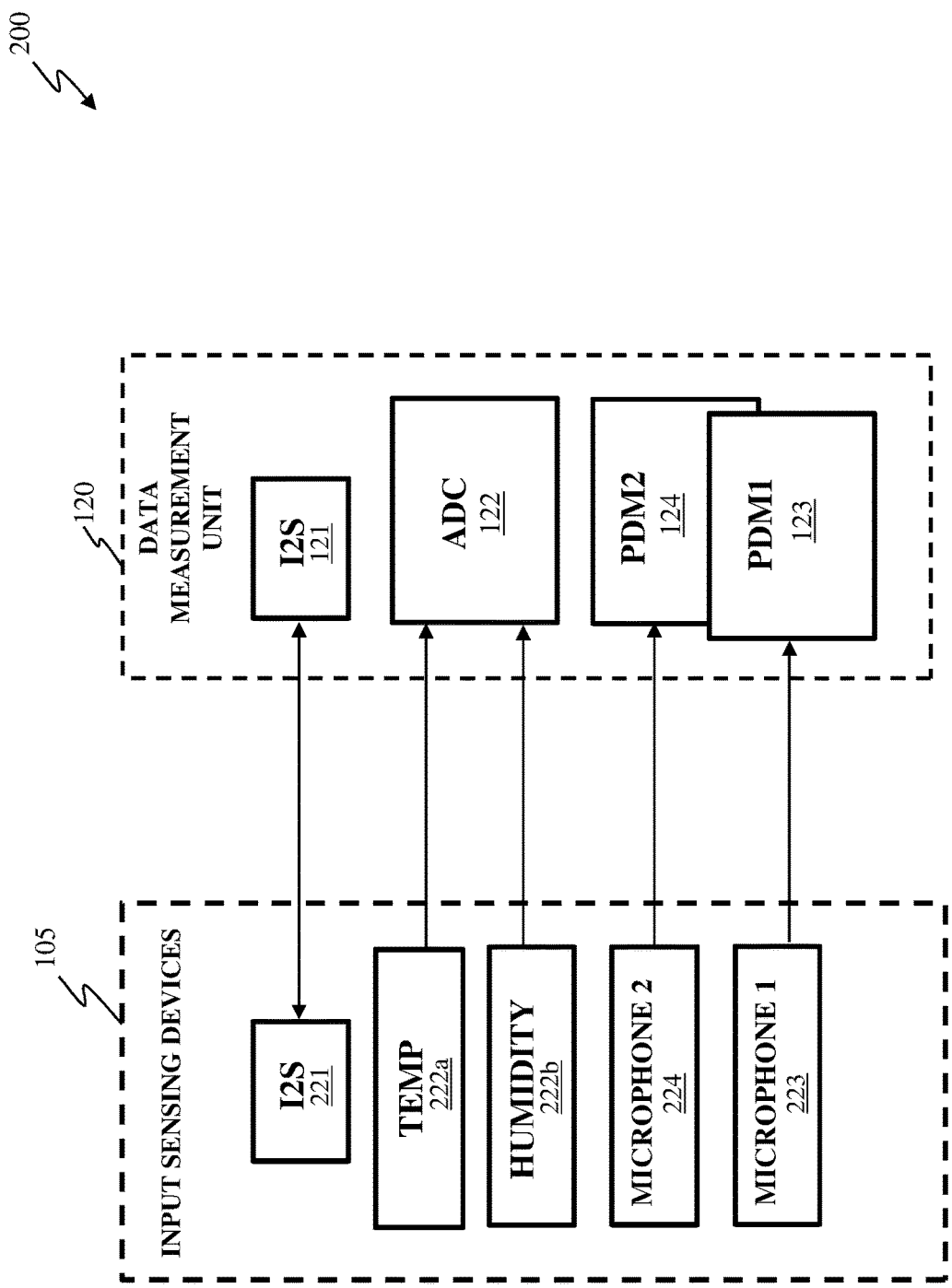
FIG. 2 illustrates a pairing example of input sensing and data measurement devices, as may be employed in the data collection system of FIG. 1.

FIG. 2 illustrates a pairing example of input sensing and data measurement devices, generally designated 200, as may be employed in the data collection system 100 of FIG. 1. The input sensing devices 105 include an Inter-IC Sound (I$^2$S) module 221, a temperature sensor 222a, a humidity sensor 222b, a first microphone 223 and a second microphone 224. These input sensing devices are respectively coupled to the I$^2$S module 121, the dual input multiplexing analog-to-digital converter (ADC) 122 and the pulse-density modulation units (PDMs) 123, 124, as shown.

Generally, the two I$^2$S modules 221 and 121 are configured to transmit digital data between the two. Depending of their application, either one of the two I$^2$S modules 221 and 121 may function as a transmitter to convey data to the other acting as a receiver of the data.

The temperature sensor 222a and the humidity sensor 222b are examples of analog devices that present continuous measurement signals to the ADC 122, which multiplexes between the two signals to provide digital representations of the two sensors. This arrangement essentially converts the temperature and humidity sensors 222a, 222b into digital sensors.

Similarly, the first and second microphones 223, 224 present continuous measurement signals respectively to the first and second PDMs 123, 124 of the data measurement unit 120. Correspondingly, this arrangement converts the first and second microphones 223, 224 into digital sensors.

Figure 3:
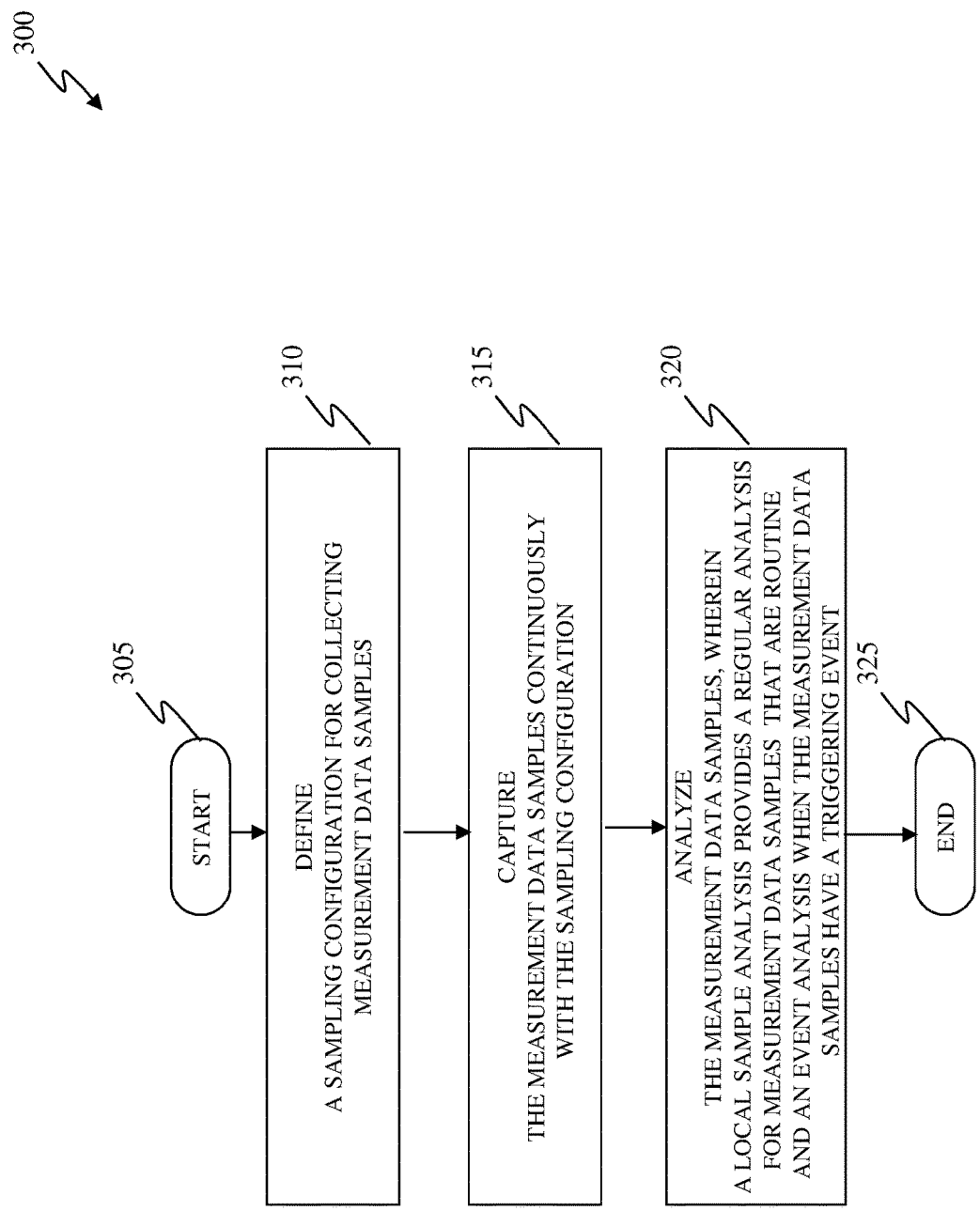
FIG. 3 illustrates a flow diagram of an embodiment of a method of measurement data sample collection, carried out according to the principles of the present disclosure.

FIG. 3 illustrates a flow diagram of an embodiment of a measurement data sample collection method, generally designated 300, carried out according to the principles of the present disclosure. The method 300 starts in a step 305, and then, a sampling configuration is defined for collecting measurement data samples, in a step 310. The measurement data samples are captured continuously with the sampling configuration, in a step 315. The measurement data samples are analyzed, wherein a local sample analysis provides a regular analysis for measurement data samples that are routine and an event analysis when the measurement data samples have a triggering event, in a step 320.

In one embodiment, defining the sampling configuration includes selecting input sensing devices coupled to data measuring devices that employ independent memory banks accessible through a local memory bus having direct memory access for storage of the measurement data samples.

In another embodiment, defining the sampling configuration and analyzing the measurement data samples include activating a digital processor having a peripheral memory, an instruction tightly coupled memory, an instruction cache and a data cache.

In yet another embodiment, analyzing the measurement data samples includes analyzing a selectable quantity of measurement data samples. In still another embodiment, analyzing the measurement data samples includes analyzing measurement data samples from multiple input sensing devices. In a further embodiment, an energy-conserving operating environment is maintained when defining, capturing and analyzing the measurement data samples. The method 300 ends in a step 325.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described system, method and apparatus or at least a portion thereof may be embodied in or performed by various processors, such as microprocessors, digital data processors, digital signal processors, or other computing devices, wherein the various processors are programmed or store executable programs or sequences of software instructions to perform one or more of actions required or method steps. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the system or carry out or direct at least some of the steps of the method set forth herein. Non-transitory medium used herein refers to all computer-readable media except for transitory, propagating signals.

Those skilled in the art to which this application relates will appreciate that other and further additions, deletions, substitutions and modifications may be made to the described embodiments.

What is claimed is:

1. A data collection integrated circuit, comprising:
   data collection circuitry in the data collection integrated circuit configured to be continuously activated to capture measurement data samples from one or more input sensing devices and locally store, via a local memory bus, the measurement data samples in operationally independent memory banks for sample analysis; and
   a digital processor, in the data collection integrated circuit and coupled to the data collection circuitry via the local memory bus, that configures a sampling configuration for capturing the measurement data samples and is configured to be separately activated from the data collection circuitry to locally analyze the stored measurement data samples and determine therefrom after being activated to:
      locally perform a regular sample analysis of the measurement data samples, and
      locally perform an event sample analysis of the measurement data samples when determining during the regular sample analysis that the measurement data samples have a triggering event, wherein the digital processor is activated based on a number of measurement data samples that has been captured.

2. The integrated circuit of claim 1 wherein the data collection circuitry includes a data measurement unit, the operationally independent memory banks are part of a local data tightly coupled memory, and the local memory bus has direct memory access.

3. The integrated circuit of claim 2 wherein the data measurement unit includes an analog to digital converter, a pulse-density modulation unit or an I-squared-circuit or system.

4. The integrated circuit of claim 1 wherein the digital processor independently selects measurement data samples via the local memory bus for independent analysis and a reduction of energy consumption.

5. The integrated circuit of claim 1 wherein the digital processor is activated when a preset number of measurement data samples has been captured.

6. The integrated circuit of claim 1 further comprising a peripheral memory that stores analysis information for use by a peripheral along with an instruction tightly coupled memory, an instruction cache and a data cache that enhance processing performance of the digital processor.

7. The integrated circuit of claim 1 wherein non-activated circuit portions are maintained in a reduced-power operating state to conserve energy.

8. The integrated circuit of claim 2 wherein a sample analysis includes analyzing measurement data samples from multiple input sensing devices coupled to the data measurement unit.

9. A measurement data sample collection method of a data collection integrated circuit, comprising:
   defining a sampling configuration for collecting measurement data samples from multiple input sensing devices coupled to the data collection integrated circuit;
   capturing the measurement data samples continuously with the sampling configuration;
   transferring, via a local memory bus of the data collection integrated circuit, the measurement data samples to independent memory banks of the data collection integrated circuit; and
   analyzing locally the measurement data samples of the independent memory banks, wherein a local sample analysis provides a regular analysis for measurement data samples that are routine and an event analysis when the measurement data samples are determined to have a triggering event during the regular analysis, wherein defining the sampling configuration and analyzing the measurement data samples are performed by a digital signal processor of the data collection integrated circuit that is directly coupled to the local memory bus and wherein the digital signal processor is activated from a reduced power state before the analyzing and after the capturing.

10. The method of claim 9 wherein defining the sampling configuration includes selecting the input sensing devices coupled to data measuring devices that employ the independent memory banks, wherein the independent memory banks are accessible to the data measuring devices and the digital processor through the local memory bus and have direct memory access for storage of the measurement data samples.

11. The method of claim 9 wherein the digital processor has a peripheral memory, an instruction tightly coupled memory, an instruction cache and a data cache.

12. The method of claim 9 wherein analyzing the measurement data samples includes analyzing a selectable quantity of measurement data samples.

13. The method of claim 9 wherein analyzing the measurement data samples includes analyzing measurement data samples from multiple input sensing devices.

14. The method of claim 9 further comprising maintaining an energy-conserving operating environment when defining, capturing and analyzing the measurement data samples.

15. A data collection system, comprising:
one or more input sensing devices; and
a data collection device, including:
data collection circuitry of the data collection device that is continuously activated to capture measurement data samples from the one or more input sensing devices and locally store the measurement data samples, via a local memory bus, in operationally independent memory banks; and
a digital processor of the data collection device that is coupled to the data collection circuitry via the local memory bus, configures a sampling configuration for capturing the measurement data samples, and is activated to locally perform a sample analysis of the measurement data samples after the measurement data samples are stored in the operationally independent memory banks,
wherein the sample analysis is a regular analysis of routine measurement data samples when the digital processor determines the measurement data samples are without a triggering event, and
wherein the sample analysis is an event analysis when the digital processor determines during the regular sample analysis that the measurement data samples include a triggering event.

16. The system of claim 15 wherein the one or more input sensing devices include analog signal devices, digital signal devices, serial data devices or pulse modulation devices.

17. The system of claim 15 wherein the data collection circuitry includes a data measurement unit having an analog to digital converter, a pulse-density modulation unit or an I-squared-circuit or system and a local data tightly coupled memory organized into the operationally independent memory banks to store the measurement data samples through the local memory bus having direct memory access.

18. The system of claim 15 wherein the data collection device further comprises a peripheral memory that stores analysis information for use by a peripheral along with an instruction tightly coupled memory, an instruction cache and a data cache that enhance processing performance of the digital processor.

19. The system of claim 15 wherein non-activated system components are maintained in a reduced-power operating state to conserve energy.

20. The system of claim 15 wherein the digital processor performs the sample analysis on a periodic basis.

* * * * *